Dec. 12, 1933.   C. C. NAEVE   1,939,017

COOKING IRON

Filed Jan. 12, 1932

INVENTOR.
C. C. NAEVE
BY
ATTORNEYS.

Patented Dec. 12, 1933

1,939,017

UNITED STATES PATENT OFFICE 1,939,017

COOKING IRON

Charles C. Naeve, Portland, Oreg.

Application January 12, 1932. Serial No. 586,181

1 Claim. (Cl. 219—19)

My invention relates to improvements in cooking irons, and it consists of the combinations, constructions and arrangements hereinafter described and claimed.

An object of my invention is to provide a cooking iron, consisting of a top section hingedly secured to a lower section, both sections having cup-shaped recesses designed to register with one another when the sections are in closed position. The device is designed to receive a batter that, when cooked, fills the recesses, with a result that the cooked article is rectangular in shape and has portions projecting beyond both surfaces and arranged in rows, the opposed portions registering with each other. The projections on the upper surface are of less height than those on the lower surface due to the fact that the recess in the upper section are more shallow than those in the lower.

A further object of my invention is to provide a device of the type described, in which the units making up the device are assembled in a novel manner.

Other objects and advantages will appear in the following specification, and the novel features of the device will be particularly pointed out in the appended claim.

Figure 1:
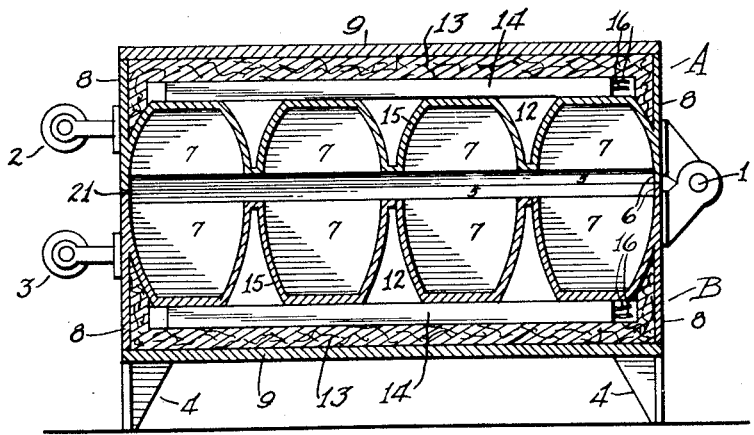
Figure 2:
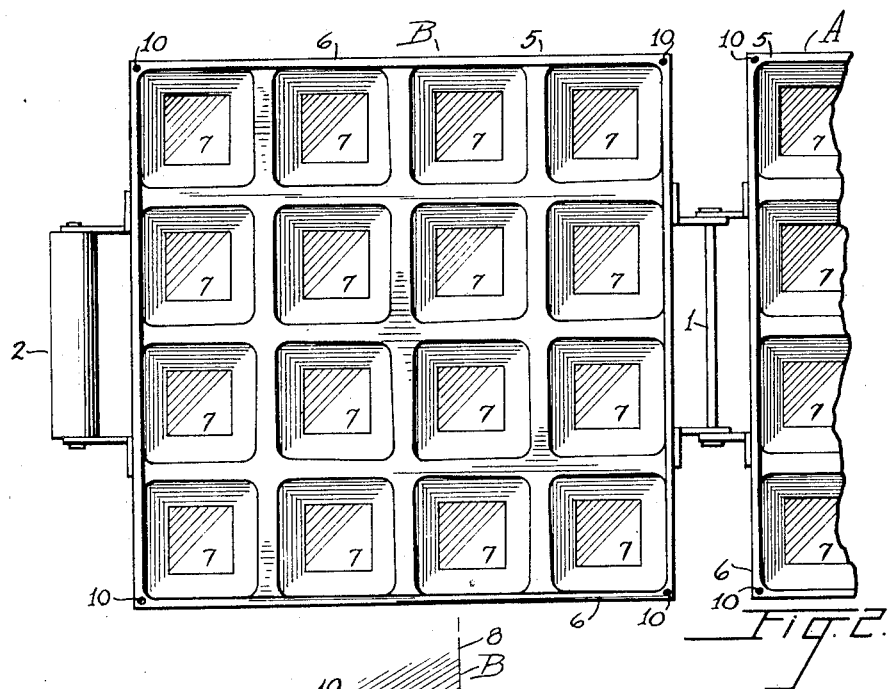
Figure 3:
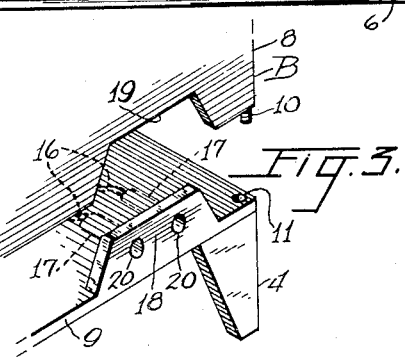

My invention is illustrated in the accompanying drawing forming a part of this application, in which Figure 1 is a vertical section through the device;

Figure 2 is a plan view of the device showing the upper section in open position; and Figure 3 is a perspective view of a part of the device.

In carrying out my invention, I provide two identical sections, the upper section being designated at A and the lower section being designated at B.

The sections are hinged together at 1, (see Figure 1), and are provided with handles 2 and 3. The lower section B is provided with supporting legs 4.

I will describe the lower section B, and this will suffice for both, since they are identical with the exception that the recesses in the upper form are of less depth than those in the lower form.

A batter-receiving form, indicated generally at 5, is shown rectangular in shape in Figure 2 and as having a flange 6 that extends around its marginal edges. The form has rows of recesses 7 therein of the shape shown for receiving batter.

Figure 1 shows the form as having integral side walls 8, and these side walls are removably secured to a bottom 9 by screws 10 that are disposed at the corners of the form. In the lower section B, screws 10 not only secure the bottom 9 in place, but also secure the legs 4 in position. Figure 3 shows an opening 11 for receiving the screw 10 that passes through the wall 8, the bottom 9 and into the leg 4.

Within the compartment 12, provided by the form 5, the walls 8 and the bottom 9, I dispose a lining of asbestos 13. The heating element 14 is placed between the lining of the asbestos 13 and the ends of the walls 15, forming the recesses 7. Electrical conducting wires 16 extend from the heating element 14 to sockets 17, (see Figure 3), these sockets being carried by a projection 18 that is integral with the bottom 9.

A recess 19 is formed in the bottom of the wall 8, and this recess receives the projection 18. The projection has openings 20 for receiving the terminals of a plug, not shown, the plug being in electrical connection with a source of current and making electrical contact with the sockets 17 when the terminals are received in the openings 20. In this way, the heating element 14 is placed in electrical connection with the source of current.

It will be seen from this construction that the form 5, together with the walls 8, may be removed from the bottom 9 without disturbing the heating element and its connections, and this permits access to the heating element so that it can be repaired if needed.

From the foregoing description of the various parts of the device, the operation thereof may be readily understood.

The top section A has its heating element 14 in electrical connection with the source of current in the same manner as that shown in Figure 3 for the lower section B. The sections A and B are disposed in open position, as shown in Figure 2, and then the batter is poured onto the form 5 of the lower section and fills the deep recesses 7. The heating elements 14 are placed in electrical connection with a source of current, and the batter is given a chance to rise partly before the upper section is closed. The batter, in being cooked, will rise and will fill the recesses 7 of the upper section A. The flanges 6, of both forms 5, abut each other and form a rectangular recess 21 for receiving batter. When the article is cooked, it will take the shape of a square corresponding to the recess 21, and the square will have projections extending from both top and bottom surfaces, these projections being arranged in rows and the projections on the top surface registering with those of the bottom surface. The upper projections will be of less height than the lower projections.

The recesses 7 are square in cross section with rounded corners. The sides of the recesses are also slightly rounding. The recesses in the lower form are twice the depth of those in the upper form.

While I have shown only the preferred form of my invention, it should be understood that various changes or modifications may be made within the scope of the appended claims without departing from the spirit of the invention.

I claim:

In an electric cooking device, a lower form plate for receiving batter, and plate having integral side walls that form a compartment, one of the walls having a recess therein, a bottom wall for closing the compartment and having a projection fitting into the recess, a heating element supported on the top of the bottom wall and enclosed by the form plate and side walls, said projection acting as a terminal block for the wires of the heating element, said projection being designed to receive an electric plug which connects the wires with a source of current.

CHARLES C. NAEVE.